United States Patent [19]

Sato

[11] Patent Number: 6,055,530

[45] Date of Patent: Apr. 25, 2000

[54] DOCUMENT INFORMATION MANAGEMENT SYSTEM, METHOD AND MEMORY

[75] Inventor: Minoru Sato, Tokyo, Japan

[73] Assignee: Kabushiki Kaisha Toshiba, Kawasaki, Japan

[21] Appl. No.: 09/033,054

[22] Filed: Mar. 2, 1998

[30] Foreign Application Priority Data

| Mar. 3, 1997 | [JP] | Japan | 9-048231 |
| Jan. 30, 1998 | [JP] | Japan | 10-019869 |

[51] Int. Cl.$^7$ .................................................. G06F 17/30
[52] U.S. Cl. .................... 707/3; 707/1; 707/2; 707/104; 707/200; 707/507; 707/520
[58] Field of Search .................. 707/10, 3, 2, 1, 707/200, 520, 507, 104

[56] References Cited

U.S. PATENT DOCUMENTS

| 4,985,863 | 1/1991 | Fujisawa et al. | 707/5 |
| 5,179,649 | 1/1993 | Masuzaki et al. | 707/507 |
| 5,265,242 | 11/1993 | Fujisawa et al. | 395/600 |
| 5,319,745 | 6/1994 | Vinsonneau et al. | 707/515 |
| 5,418,946 | 5/1995 | Mori | 707/1 |
| 5,454,105 | 9/1995 | Hatakeyama et al. | 707/2 |
| 5,678,046 | 10/1997 | Cahill et al. | 707/200 |
| 5,712,979 | 1/1998 | Graber et al. | 709/224 |
| 5,802,515 | 9/1998 | Adar et al. | 707/5 |
| 5,848,407 | 12/1998 | Ishikawa et al. | 707/2 |
| 5,848,413 | 12/1998 | Wolff | 707/10 |
| 5,857,179 | 1/1999 | Vaithyanathan et al. | 707/2 |
| 5,893,093 | 4/1999 | Wills | 707/5 |
| 5,893,109 | 4/1999 | DeRose et al. | 707/104 |
| 5,905,980 | 5/1999 | Masuichi et al. | 707/1 |
| 5,913,208 | 6/1999 | Brown et al. | 707/3 |
| 5,920,856 | 7/1999 | Syeda-Mahmood | 707/3 |
| 5,926,824 | 7/1999 | Hashimoto | 707/520 |

FOREIGN PATENT DOCUMENTS

| 62-34278 | 2/1987 | Japan . |
| 62-44878 | 2/1987 | Japan . |
| 62-106574 | 5/1987 | Japan . |
| 62-248375 | 10/1987 | Japan . |
| 2-253474 | 10/1990 | Japan . |
| 2-278375 | 11/1990 | Japan . |
| 3-132874 | 6/1991 | Japan . |
| 6-168276 | 6/1994 | Japan . |
| 8-69477 | 3/1996 | Japan . |

OTHER PUBLICATIONS

Isamu Iwai et al. "System for Searching a Multimedia Document by a Full–Text Search" The Journal of Information Sciences Technology Association, vol. 42, No. 10, p. 942–945 (1992).

"Large–Scale Optical Disk Data File System for Recording All 50–Million Cases under the Patent Classification" Nikkei Electronics Oct. 6, (1986).

Nikkei Byte, Oct. 1996 issue, pp. 142–167.

*Primary Examiner*—Anton W. Fetting
*Assistant Examiner*—Jean M. Corrielus
*Attorney, Agent, or Firm*—Finnegan, Henderson, Farabow, Garrett & Dunner, L.L.P.

[57] ABSTRACT

A document is read as an image file and stored. At this time, a table is updated. On the table, each of words included in text information obtained by character-recognizing image information output from the read means is associated with a page number of a page including each word and a storage position of the image information. With this table, not only the image information is provided by a full-text search, but also the page number of the page including the search keyword can be provided. The provision of the page number has a potential to facilitate search operations.

6 Claims, 18 Drawing Sheets

| CHARACTER SEQUENCE (KEY WORD) 101 | DOCUMENT NO. 106 | PAGE NO. 107 |
|---|---|---|
| COMPUTER | 1 | 4 |
|  | 2 | 1 |
|  | ⋮ | ⋮ |
| NETWORK | 8 | 10 |
|  | 9 | 6 |
|  | ⋮ | ⋮ |
| VIRTUAL MEMORY | 13 | 5 |
|  | ⋮ | ⋮ |
| ⋮ | ⋮ | ⋮ |
| CACHE MEMORY | 85 | 2 |
|  | ⋮ | ⋮ |

104 TEXT TABLE

TITLE INFORMATION

| TEXT FILE NAME | PASS TO IMAGE | MEDIA | (OTHER INFORMATION) |
|---|---|---|---|
| △△△△ | ¥○○○¥□□□.tif | AC1 | |
| △×△○ | ¥×××¥△○×.tif | HD | |

DATA SOURCE [ A L B A _ D O C ↓ ]

USER ID [ = ]

PASSWORD [ * * * * * * * * * ]

◎ BOOKSHELF LIST   ○ BOX ATTRIBUTE LIST

[ RETRIEVE ]   [ CANCEL ]

FIG. 9

~BOOKSHELF LIST~

|  | BOOKSHELF NO. | BOOKSHELF NAME | COMMENT |
|---|---|---|---|
| ◎ | 1 | BOOKSHELF 1 | COMMENT 1 |
| ○ | 2 | BOOKSHELF 2 | COMMENT 2 |
| ○ | 3 | BOOKSHELF 3 | COMMENT 3 |
| ○ | 4 | BOOKSHELF 4 | COMMENT 4 |
| ○ | 5 | BOOKSHELF 5 | COMMENT 5 |
| ○ | 6 | BOOKSHELF 6 | COMMENT 6 |
| ○ | 7 | BOOKSHELF 7 | COMMENT 7 |
| ○ | 8 | BOOKSHELF 8 | COMMENT 8 |
| ○ | 9 | BOOKSHELF 9 | COMMENT 9 |
| ○ | 10 | BOOKSHELF 10 | COMMENT 10 |

[ DOCUMENT BOX LIST ]

~BOX ATTRIBUTE LIST~

|   | BOX ATTRIBUTE NO. | BOX ATTRIBUTE NAME |
|---|---|---|
| ◎ | 1 | BOX ATTRIBUTE 01 |
| ○ | 2 | BOX ATTRIBUTE 02 |
| ○ | 3 | BOX ATTRIBUTE 03 |
| ○ | 4 | BOX ATTRIBUTE 04 |
| ○ | 5 | BOX ATTRIBUTE 05 |

[SEARCH CONDITION]

FIG. 12

―DOCUMENT BOX LIST―

|   | DOCUMENT BOX NO. | DOCUMENT BOX NAME | BOX ATTRIBUTE NAME | BACKBONE | COMMENT |
|---|---|---|---|---|---|
| ◎ | 11 | DOCUMENT BOX 01 | BOX ATTRIBUTE 01 | BACKBONE 01 | COMMENT 01 |
| ○ | 12 | DOCUMENT BOX 01 | BOX ATTRIBUTE 01 | BACKBONE 02 | COMMENT 02 |
| ○ | 13 | DOCUMENT BOX 01 | BOX ATTRIBUTE 01 | BACKBONE 03 | COMMENT 03 |
| ○ | 14 | DOCUMENT BOX 01 | BOX ATTRIBUTE 01 | BACKBONE 04 | COMMENT 04 |
| ○ | 15 | DOCUMENT BOX 01 | BOX ATTRIBUTE 01 | BACKBONE 05 | COMMENT 05 |
| ○ | 16 | DOCUMENT BOX 01 | BOX ATTRIBUTE 02 | BACKBONE 06 | COMMENT 06 |
| ○ | 17 | DOCUMENT BOX 01 | BOX ATTRIBUTE 02 | BACKBONE 07 | COMMENT 07 |
| ○ | 18 | DOCUMENT BOX 01 | BOX ATTRIBUTE 02 | BACKBONE 08 | COMMENT 08 |
| ○ | 19 | DOCUMENT BOX 01 | BOX ATTRIBUTE 02 | BACKBONE 09 | COMMENT 09 |
| ○ | 20 | DOCUMENT BOX 01 | BOX ATTRIBUTE 02 | BACKBONE 10 | COMMENT 10 |

[SEARCH CONDITION]

SEARCH CONDITION INPUT
BOX ATTRIBUTE NAME :
BOX ATTRIBUTE 01

KEY 01  CHARACTER TYPE
        256 FIGURES

KEY 02  NUMERAL TYPE    = ↓
        10 FIGURES

KEY 03  DIFFERENT                     ↓
        NAME TYPE

DATE OF FORMATION       = ↓

DATE OF UPDATING        = ↓

[ SEARCH START ]   [ CANCEL ]

FIG. 13

SEARCH RESULT LIST

| | NO. | KEY 01 | KEY 02 | KEY 03 | DATE OF PRODUCTION | DATE OF UPDATING |
|---|---|---|---|---|---|---|
| ◎ | 1 | ABCDE | 12345 | DIFFERENT NAME TYPE 01 | 1996/12/03 | 1996/12/03 |
| ○ | 2 | BCDEF | 23456 | DIFFERENT NAME TYPE 02 | 1996/12/03 | 1996/12/03 |

[ PAGE LIST ]   [ TOP PAGE LIST ]

FIG. 15

FIG. 20A DESIGNATION OF MEDIA(MO)
AC  AC1:¥○○○¥□□□.tif

FIG. 20B
| DESIGNATION OF MEDIA | SLOT | SIDE |
|---|---|---|
| AC1 | 1 | UPPER SIDE |
TABLE

FIG. 20C
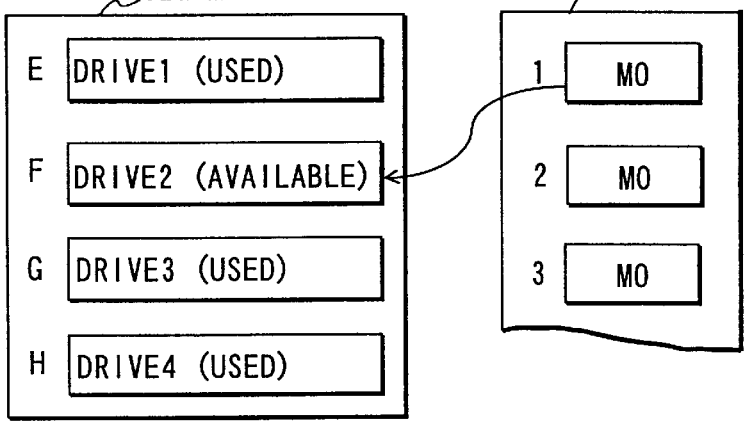
32a MO DRIVE
- E DRIVE1 (USED)
- F DRIVE2 (AVAILABLE)
- G DRIVE3 (USED)
- H DRIVE4 (USED)

32b AUTO CHANGER
1 MO
2 MO
3 MO

FIG. 20D CHANGE TO DRIVE NAME
F:¥○○○¥□□□.tif

FIG. 21

100 DOCUMENT TABLE

| 101 DOCUMENT NO. | DOCUMENT NAME | 102 SEARCH KEY — NAME OF PRODUCER OF DOCUMENT | 103 JOINT NO. |
|---|---|---|---|
| 1 | DOCUMENT 1 | TOKYO TARO | 1 |
| 2 | DOCUMENT 2 | TOKYO HANAKO | 2 |
| ⋮ | ⋮ | ⋮ | ⋮ |

| CHARACTER SEQUENCE (KEY WORD) | DOCUMENT NO. | PAGE NO. |
|---|---|---|
| COMPUTER | 1 | 4 |
| | 2 | 1 |
| | ⋮ | ⋮ |
| NETWORK | 8 | 10 |
| | 9 | 6 |
| | ⋮ | ⋮ |
| VIRTUAL MEMORY | 13 | 5 |
| | ⋮ | ⋮ |
| ⋮ | ⋮ | ⋮ |
| CACHE MEMORY | 85 | 2 |
| | ⋮ | ⋮ |

FIG. 22    104 TEXT TABLE

108 IMAGE TABLE

| PAGE NO. | MEDIA NO. | FILE NAME |
|---|---|---|
| 1 | M01 | ×××.tif |
| 2 | M01 | △△△.tif |
| 3 | M01 | □□□.tif |
| 4 | M01 | ○○○.tif |

JOINT NO. n
JOINT NO. 3
JOINT NO. 2
JOINT NO. 1

FIG. 23

| NUMBER | DOCUMENT NAME | NAME OF PRODUCER OF DOCUMENT | ASSOCIATED PAGE NO. |
|---|---|---|---|
|  |  |  |  |
|  |  |  |  |
|  |  |  |  |
|  |  |  |  |

[ PAGE LIST ]   [ TOP PAGE LIST ]   [ SERECT ]

[ NEXT PAGE ]   [ PREVIOUS PAGE ]   [ PAGE SERECT ]

FIG. 26

[IMAGE OF 1ST PAGE]   [IMAGE OF 1ST PAGE]   [IMAGE OF 1ST PAGE]

DOCUMENT NAME
ASSOCIATED
PAGE NO.

DOCUMENT NAME
ASSOCIATED
PAGE NO.

DOCUMENT NAME
ASSOCIATED
PAGE NO.

[ NEXT PAGE ]   [ PREVIOUS PAGE ]   [ PAGE SERECT ]

[ SERECT ]

FIG. 27

DOCUMENT INFORMATION MANAGEMENT SYSTEM, METHOD AND MEMORY

BACKGROUND OF THE INVENTION

The present invention relates to a document information management system for managing information (document information) recorded on a medium such as paper as an image file, a document information management method and a document search method.

In general, in a filing system, information recorded on a paper medium such as a slip is read by means of a scanner, etc. under control of an exclusive-use terminal apparatus (client) for the filing system, and a read image (file) is associated with a search key and registered in a filing server. A search key associated with a target image file is input through the exclusive-use terminal apparatus, and thereby the target image file can be specified from a number of image files stored in the filing server.

The search keys are, in most cases, characteristic words recorded on paper media, such as slip numbers, titles, or dates. The conventional filing system requires manual input of such search keys through keyboard operations.

Accordingly, in a case where a great number of paper media are filed in the form of image files, the operator is required to input search keys through a keyboard operation each time paper media are read by the scanner one by one or in units of a series. This is very time-consuming.

There is known an OCR (Optical Character Reader) for optically recognizing characters recorded on paper. This apparatus merely outputs characters such as slip numbers or titles recorded on slips in the form of text files, and does not have a function of systematically storing the text files in association with image files. In the prior art, in order to systematically store the text files obtained by the OCR apparatus in association with image files obtained by the scanner, an operation is required to input information representing the relationship between the text files and image files.

Either in a case of using the filing system or in a case of using the OCR apparatus, it is not possible to file image files by simple operations.

BRIEF SUMMARY OF THE INVENTION

The object of the present invention is to provide a document information management system, a document information management method and a recording medium for efficiently filing document information recorded on a medium such as paper as image files.

The present invention has the following operational advantages.

A document is read as an image file and stored. At this time, a table is updated. On the table, each of words included in text information obtained by character-recognizing image information output from the read means is associated with a page number of a page including each word and a storage position of the image information. With this table, not only the image information is provided by a full-text search, but also the page number of the page including the search keyword can be provided. The provision of the page number has a potential to facilitate search operations.

BRIEF DESCRIPTION OF THE SEVERAL VIEWS OF THE DRAWING

FIG. 9 shows an example of a search request screen in this embodiment.

FIG. 10 shows an example of a bookshelf list displayed on the WWW browser shown in FIG. 5.

FIG. 11 shows an example of a box attribute list displayed on the WWW browser shown in FIG. 5.

FIG. 12 shows an example of a document box list displayed on the WWW browser shown in FIG. 5.

FIG. 13 shows an example of a screen for inputting search conditions in the present embodiment.

FIG. 15 shows an example of a display screen of a search result displayed on the WWW browser shown in FIG. 5.

FIGS. 20A, 20B, 20C and 20D are views for describing a file access operation in the hierarchical storage.

FIG. 21 shows a data structure on a document table.

FIG. 22 shows a data structure on a text table.

FIG. 23 shows a data structure on an image table.

FIG. 26 shows an example of a display screen of a search result.

FIG. 27 shows another example of the display screen of the search result.

DETAILED DESCRIPTION OF THE INVENTION

Figure 1:
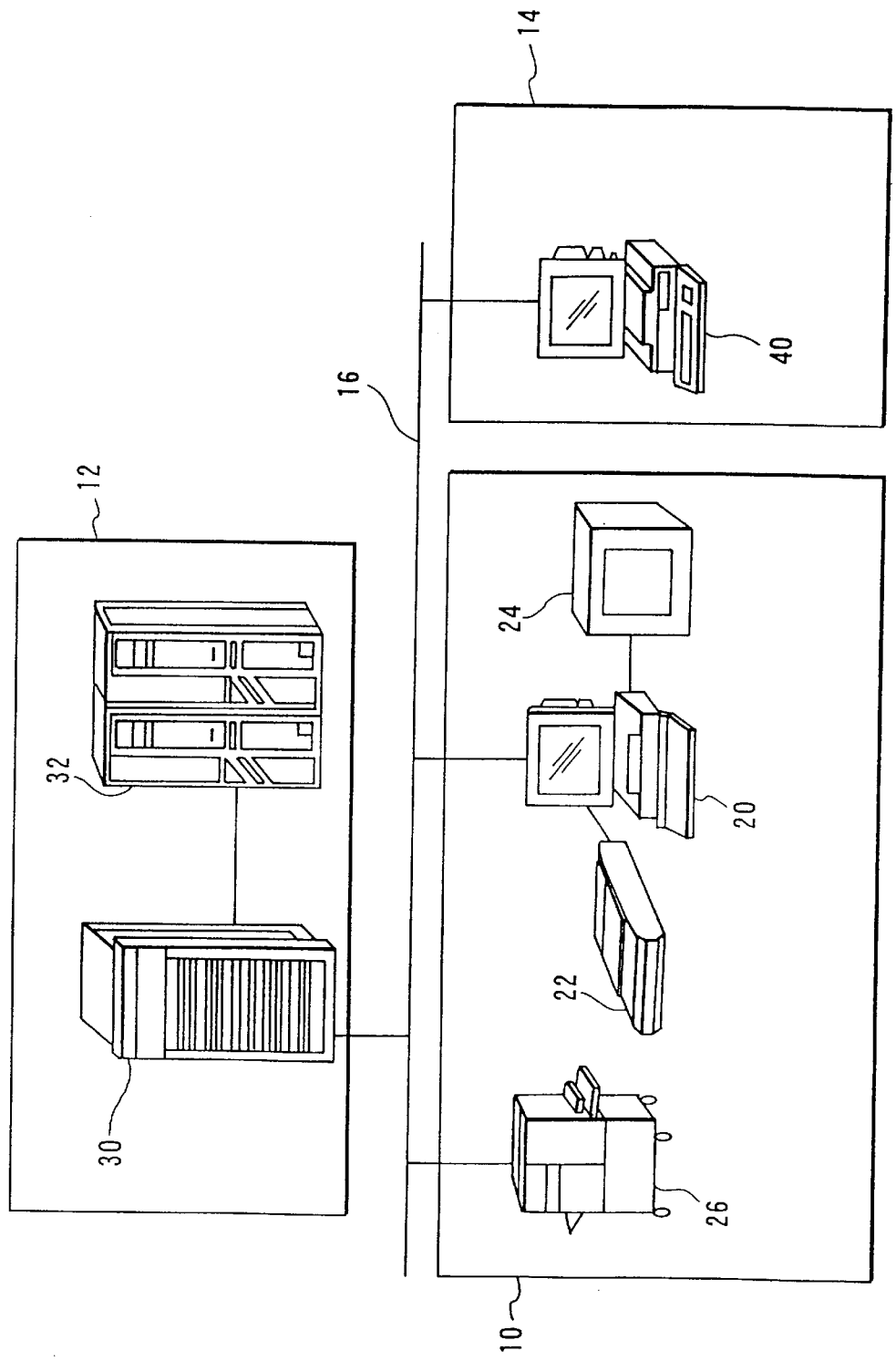
FIG. 1 shows the structure of a document information management system according to an embodiment of the present invention.

An embodiment of the present invention will now be described with reference to the accompanying drawings. FIG. 1 shows the structure of a document information management system according to the embodiment. As is shown in FIG. 1, the document information management system of this embodiment is constituted such that an input/output unit 10, a document information accumulation unit 12 and a search unit 14 are connected by a network 16.

The input/output unit 10 functions to form image files by reading information recorded on paper media such as documents or slips by means of a color scanner 22, and subjecting the read image files to a character recognition process, thereby preparing text files of all the obtained characters and accumulating the text files in the document information accumulation unit 12.

The document information accumulation unit 12 functions to prepare title information representing the relationship between the image files and text files formed by the input/output unit 10, store the image files and text files, and search the text files on the basis of a designated word upon a search request from the search unit 14 and output to the search unit 14 the image file corresponding to the text file by discriminating the image file from the title information.

The search unit 14 functions to output to the document information accumulation unit 12 an image file search request based on word designation and acquire from the document information accumulation unit 12 the image file corresponding to the search request.

The structures of the input/output unit 10, document information accumulation unit 12 and search unit 14 will now be described in detail.

Figure 2:
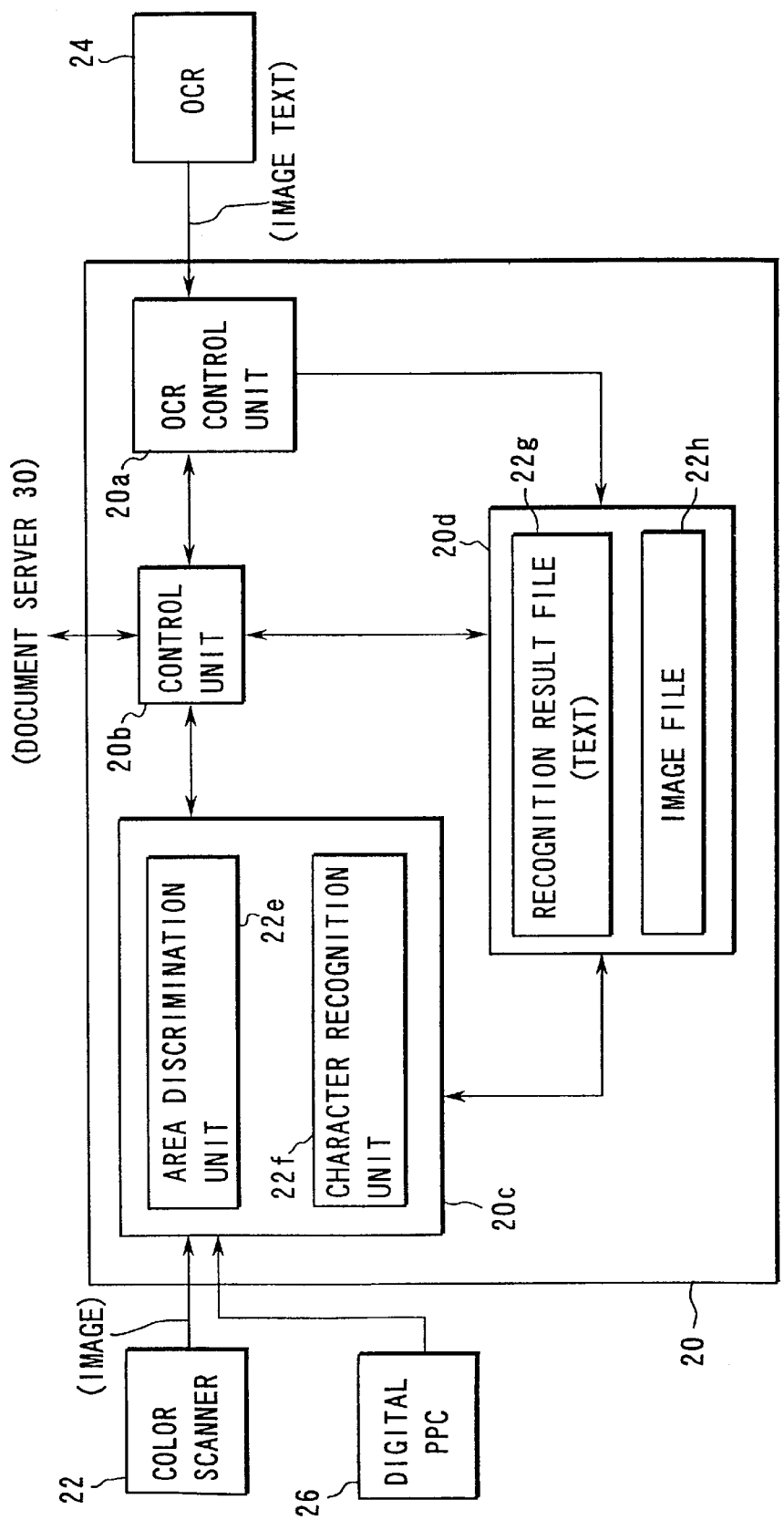
FIG. 2 is a block diagram of an image input control apparatus shown in FIG. 1.

FIG. 2 is a block diagram showing the detailed structure of the input/output unit 10. As is shown in FIG. 2, the input/output unit 10 in this embodiment comprises an image file input control apparatus 20, a color scanner 22, an OCR 24 and a digital PPC 26. The image file input control apparatus 20 is realized by a computer whose operation is controlled by a program read out from a recording medium such as a magnetic disk.

The image file input control apparatus 20 has functions of preparing image files of information recorded on paper media such as documents or slips and files of recognition results (texts) on characters included in the image files, by using the color scanner 22, OCR 24 and digital PPC 26, and filing the prepared files in the document information accumulation unit 12.

The image file input control apparatus 20 comprises, as shown in FIG. 2, an OCR control unit 20a, a control unit 20b, an image file processing unit 20c and a storage unit 20d.

The OCR control unit 20a controls the processing in the OCR 24, acquires image files and text files which are the processing results in the OCR 24, and stores the acquired files in the storage unit 20d.

The control unit 20b controls the entirety of the image file input control apparatus 20 and performs processing for systematically registering in the document information accumulation unit 12 the files to be filed, which are stored in the storage unit 20d.

The image file processing unit 20c acquires image files obtained by the color scanner 22 or digital PPC 26 and stores them in the storage unit 20d, and also subjecting the acquired image files to a character recognition process and stores the recognition results (texts) in the storage unit 20d. The image file processing unit 22 is provided with functions of an area discrimination unit 22e and a character recognition unit 22f.

The area discrimination unit 22e discriminates the area on which characters are recorded, on the basis of the acquired image file. The character recognition unit 22f recognizes the characters included in the area discriminated by the area discrimination unit 22e. A recognition result of the character recognition unit 22f is stored in the storage unit 20d in association with the image file to be processed.

The storage unit 20d stores, for example, the processing result of the OCR 24 and the processing result of the image file processing unit 20c, i.e. a recognition result file (text file) 22 and an image file 22h, as well as temporary data for the processing in the image file processing unit 20c and for the filing processing for the document information accumulation unit 12.

The color scanner 22 reads the image file of information recorded on a paper medium such as a document or a slip, and outputs the image file to the image file input control apparatus 20 (image file processing unit 20c).

The OCR 24 performs a character recognition process for characters in the image file read by the scanner 22, which characters are located at a predetermined position, thereby preparing a text file. The OCR 24 outputs each file to the image file input control apparatus 20 (OCR control unit 20a).

The digital PPC 26 has a function of reading the information recorded on the paper medium such as a document or a slip as an image file, a function of printing the image file which the search unit 14 acquired from the document information accumulation unit 12, and a function of a copying machine.

In this embodiment, the input/output unit 10 acquires data from the document information accumulation unit 12 as text files or image files. However, other data files such as voice or moving pictures may be obtained.

Figure 3:
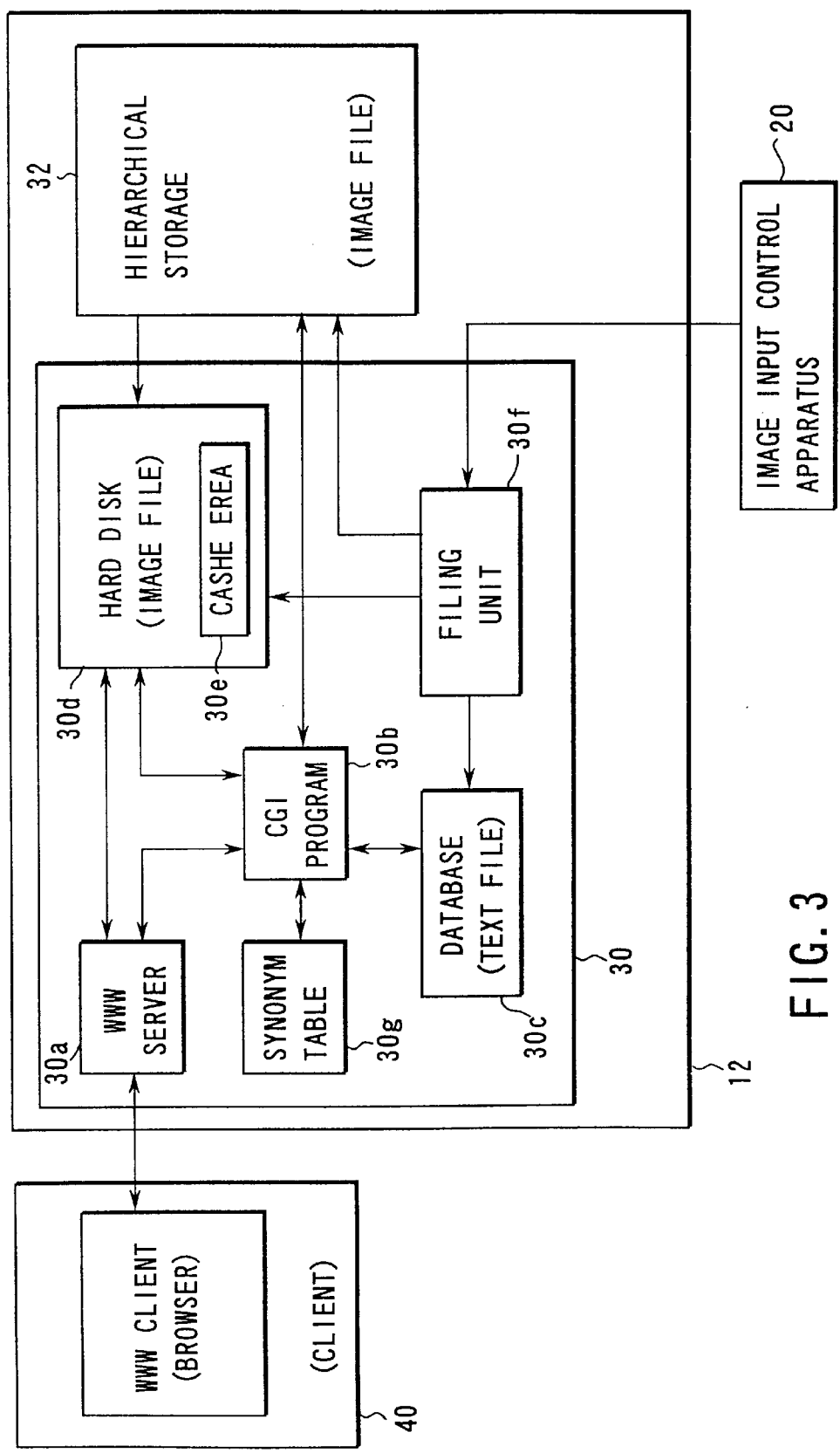
FIG. 3 is a block diagram of a document information accumulation unit shown in FIG. 1.

FIG. 3 is a block diagram showing a detailed structure of the document information accumulation unit 12. As is shown in FIG. 3, the document information accumulation unit 12 in this embodiment comprises a document server 30 and a hierarchical storage 32.

The document server 30 is constituted by a computer which reads in a program from a recording medium such as a magnetic disk and has its operations controlled by the program. The document server 30 performs a filing control of various files between itself and the image file input control apparatus 20 or a search control of files between itself and the search unit 14.

As is shown in FIG. 3, the document server 30 comprises a WWW server 30a, a CGI program 30b, a database 30c, a hard disk 30d, a filing unit 30f, and a synonym table 30g.

The WWW server 30a performs data transmission between itself and the search unit 14 (WWW client) and has an external program executed by using a CGI (common gateway interface), thus enabling a file search process, etc. to be executed. The WWW server 30a supplies an image file acquired and stored in the hard disk 30d to an origin of a search request.

The CGI program 30b is a program executed via the CGI. According to this program, a search process associated with the database 30c and a process associated with files stored in the hierarchical storage 32 (an image file acquisition process) are executed. The CGI is an interface through which the WWW server 30a executes the external program. In the search process, on the basis of a word designated by the search request from the search unit 14, the CGI program 30b searches all characters of text files stored in the database 30c, and discriminates an associated text file. In addition, in the image file acquisition process, the CGI program 30b, upon receiving a select instruction from the search unit 14 for a search candidate or the text file discriminated by the search process, acquires from the hierarchical storage 32 the image file corresponding to the selected text file on the basis of title information (to be described later in detail) and stores the acquired image file in the hard disk 30d.

The database 30c stores text files from the input/output unit 10 (image file input control apparatus 20). On the basis of title information of each of the text files stored in the database 30c, an associated image file can be referred to.

The hard disk 30d stores image files from the input/output unit 10 (image file input control apparatus 20). Image files can be read out from the hard disk 30d more quickly from the hierarchical storage 32. The hard disk 30d is provided with a cache area 30e for storing the image file acquired from the hierarchical storage 32 by the image file acquisition process of the CGI program 30b. In the cache area 30e, the following are designated in advance: the name of drive for permitting access by the WWW server 30a, the directory indicating logical memory positions, the size of area, and the ratio of upper and lower limits of the use area to the whole area, which is used for management of stored files (deletion of unnecessary files).

The filing unit 30f stores the text file to be filed from the image file input control apparatus 20 into the database 30c, and also stores the image file into the hard disk 30d or hierarchical storage 32. At the time of storing the image file and the text file corresponding to the image file into the associated recording media, the filing unit 30f prepares title information indicating the correspondency between the image file and text file, thus permitting reference by the CGI program 30b.

The synonym 30g is referred to by the CGI program 30b to find synonyms of a word designated by a search request from the search unit 14. A plurality of words and their synonyms are associated and registered in the synonym table 30g. In the search process by the CGI program 30b, a search is performed on the basis of the word designated by the search request and, in addition, the synonym of the designated word is discriminated from the synonym table 30 and a search based on the synonym is also performed.

The hierarchical storage 32 is a large-capacity recording medium and is used for accumulating image files in the present embodiment. The hierarchical storage 32 can, of course, store text files and data files of voice, moving pictures, etc., too. The storage 32 may comprise DVDs (digital video disk) and MOs (magneto-optical disk) as recording media. In this embodiment, MOs are used.

Figure 4:
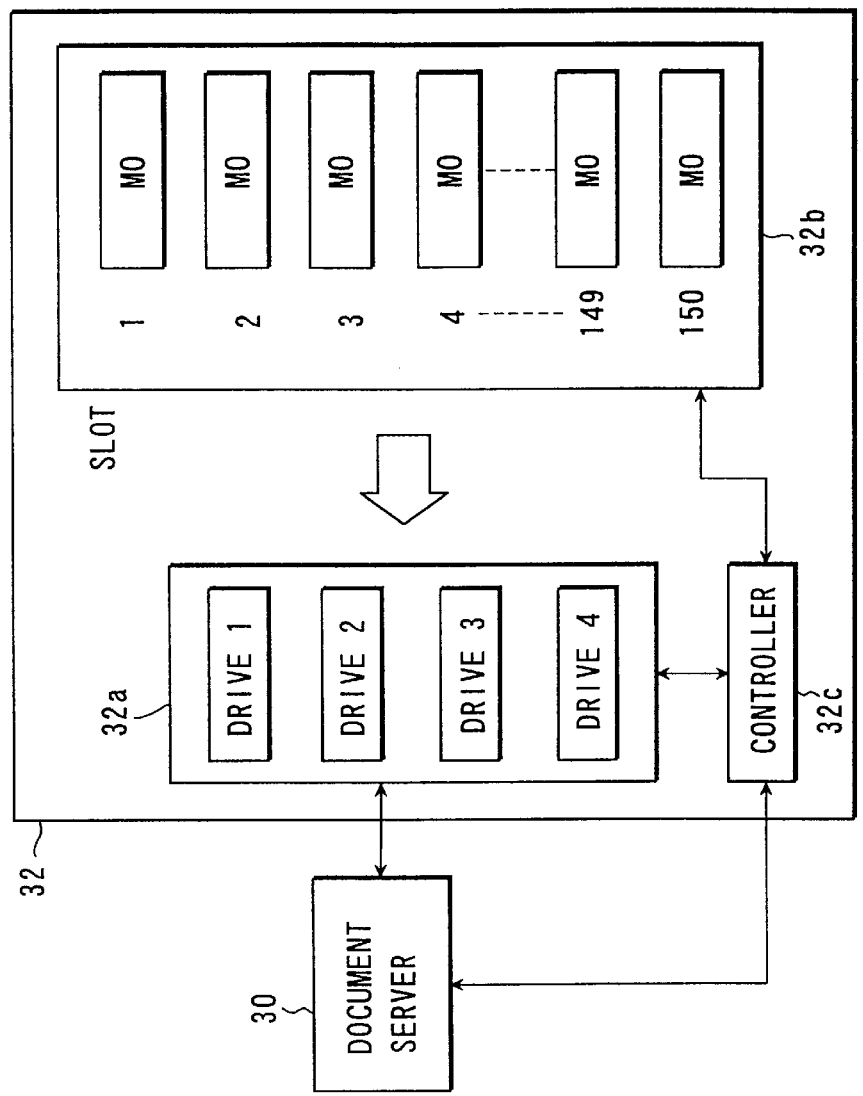
FIG. 4 is a block diagram of a hierarchical storage shown in FIG. 1.

FIG. 4 is a block diagram showing a detailed structure of the hierarchical storage 32. The hierarchical storage 32, as shown in FIG. 4, comprises an MO drive 32a, an autochanger (AC) 32b and a controller 32c.

Predetermined ones of MOs (magneto-optical disks) in the autochanger 32b are selected and mounted in the MO drive 32a, whereby read/write of image files is executed. The MO drive 32a in this embodiment comprises four drives 1 to 4 which are activated in accordance with the designation of drive (e.g. E, F, G, or H) by the document server 30 (CGI program 30b).

In the autochanger 32b, a plurality of MOs (150 MOs in this embodiment) are mounted in slots (1 to 150). Predetermined MOs are mounted in the drives of the MO drive 32a on an as-needed basis.

The controller 32c enables the document server 30 (CGI program 30b) to access (i.e. acquire image files from) the specific MO indicated by the title information from the document server 30, on the basis of the drive name determined when the MO is mounted in the MO drive 32a.

Figure 5:
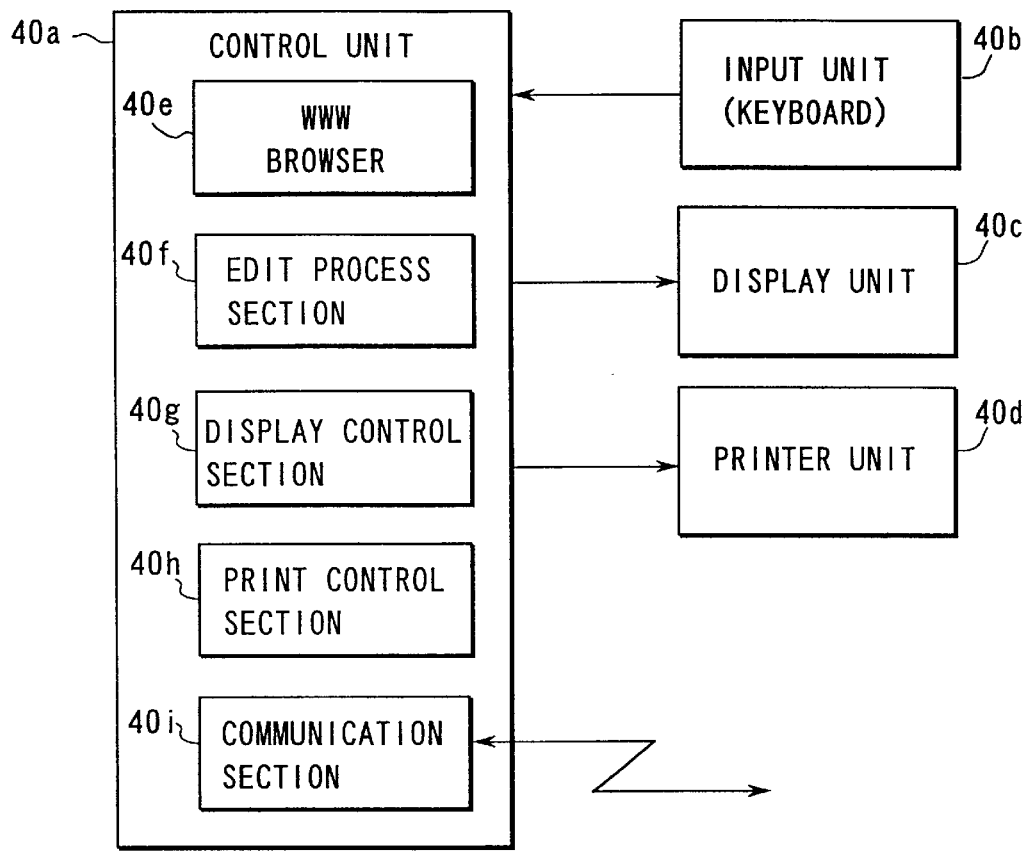
FIG. 5 is a block diagram of a search unit shown in FIG. 1.

FIG. 5 is a block diagram showing detailed functions and structures of the search unit 14 which comprises a personal computer 40. As is shown in FIG. 5, the personal computer 40 comprises the functions of a control unit 40a, an input unit 40b, a display unit 40c and a printer unit 40d.

The control unit 40a controls the entirety of the apparatus. The control unit 40a has functions of requesting search of an image file, editing/processing the searched image file, and outputting the image file by displaying or printing. Needless to say, the control unit 40a can process data other than the image file. The detailed structures will be described later.

The input unit 40b comprises a keyboard, etc. The input unit 40b is used to input data, commands, etc. to the apparatus. The display unit 40c displays an operation screen for image file search, etc. The printer unit 40d prints texts, image files, etc. onto paper media. The printer unit 40d may be the digital PPC 26 which is used in the input/output unit 10 for reading image files.

The control unit 40a comprises the functions of a WWW browser 40e, an edit process section 40f, a display control section 40g, a print control section 40h and a communication section 40i.

The WWW browser 40e performs communications with the document server 30 (WWW server 30a) of document information accumulation unit 12 through simple operations using a GUI (graphical user interface), and executes a process such as image file search.

The edit process section 40f edits or processes the data, such as image files, which is acquired from the document information accumulation unit 12.

The display control section 40g controls display on the display unit 40c and displays information, etc. provided by the WWW browser 40e. The print control section 40h controls the printing of image files, etc. by the printer unit 40d.

The communication section 40i controls communications with the document server 30 of document information accumulation unit 12 or the printer unit such as digital PPC 26 over the network 16.

The operation of the document information management system according to the present embodiment will now be described. At first, an operation of filing information (text file, image file) in the document information accumulation unit 12 will be described.

When an image file has been read from paper medium such as a document by the color scanner 22 or digital PPC 26, a text file and an image file are obtained by the processing of the image file processing unit 20c in the image file input control apparatus 20.

Specifically, the area discrimination unit 22e of image file processing unit 20c discriminates a text area of the read image file, on which characters are recorded. The character recognition unit 22f performs character recognition on all characters on the text area discriminated by the area discrimination unit 22e.

Figures 6, 7:
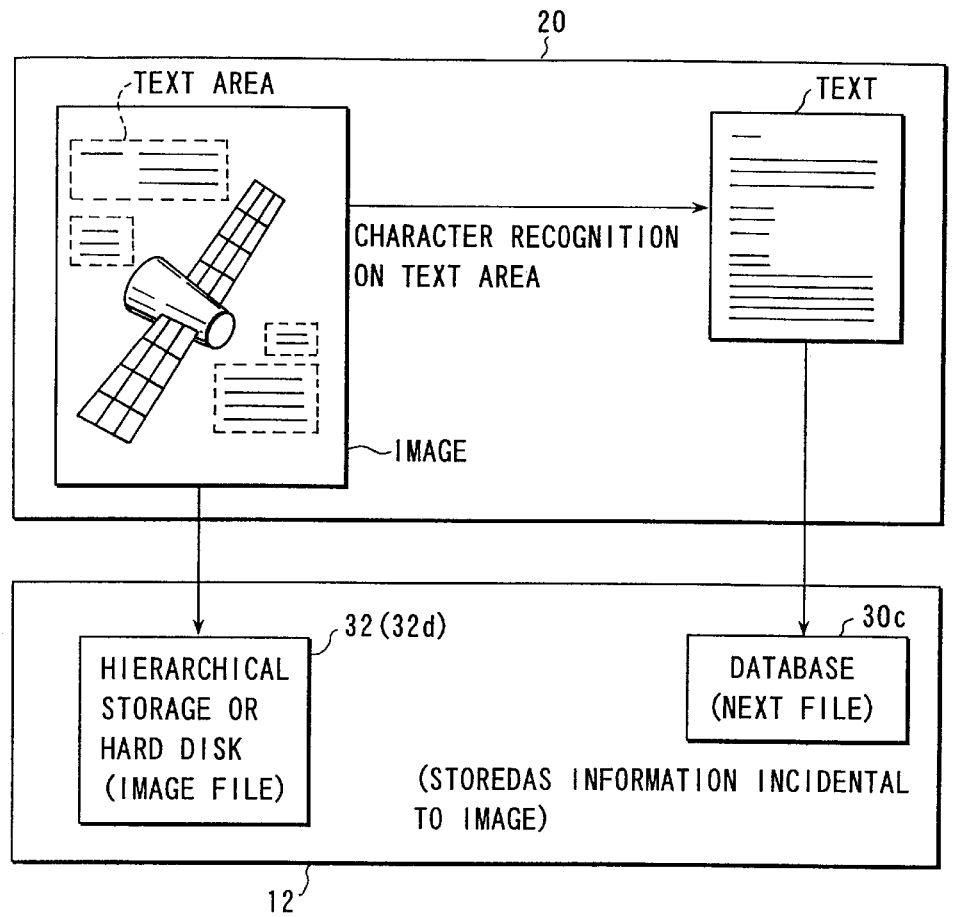
FIG. 6 illustrates concepts of an image file and a text file in the present embodiment.
FIG. 7 shows an example of title information in this embodiment.

The image file processed by the image file processing unit 20c and the character recognition result (text) by the character recognition unit 22f are stored in the storage unit 20d. FIG. 6 is a conceptual view illustrating a process of acquiring the image file and text.

On the other hand, when a paper medium such as a slip is processed by the OCR 24, a text file and an image file are acquired under control of the OCR control unit 20a of image file input control apparatus 20.

The OCR 24 reads an image file of the slip to be processed. Characters are read from the image file to produce a text file. The OCR control unit 20a acquires the image file and text file, which are the processing results of the OCR 24, and stores them in the storage unit 20d.

The image file input control apparatus 20 can register files for the filing in the document information accumulation unit 12 so that these files may be hierarchically managed. In the present embodiment, a minimum unit of a file is set to be one page (corresponding to one paper sheet). A plurality of pages is treated as one document. A plurality of documents is managed as a document box, and a plurality of document boxes is managed as a bookshelf. Furthermore, a plurality of bookshelves is managed as a data source.

The document information accumulation unit 12 performs a filing operation for the files (image files, text files) from the image file input control apparatus 20 in the following manner (see FIGS. 3 and 6). The filing unit 30f of document server 30 stores the image files in the hard disk 30d or hierarchical storage 32, and stores the text files in the database 30c as incidental information to the image files.

In addition, the filing unit 30f prepares title information indicating the correspondency between the image files and text files. FIG. 7 shows an example of title information. In the title information, as shown in FIG. 7, for example, a text file name of a text file registered in the database 30c is associated with information indicating a medium storing a corresponding image file and a path (directory) indicating a logical storage position in the medium storing the image file.

The information indicating the medium is a drive name in the case where the image file is stored in the hard disk 30d. However, in the case where the image file is stored in the MO in the autochanger of hierarchical storage 32, that information indicates the MO itself, and not the drive name of the MO drive 32a. For example, when the image file is stored on the MO medium (surface) of the slot 1 of autochanger 32b, information "AC1" indicating the slot 1 and the surface of MO medium is set.

Each file is accompanied with the date of formation, the date of updating and other attributive information, and it is thus filed.

Next, the operation of searching the image file accumulated in the document information accumulation unit 12 will now be described (see FIG. 3).

In the personal computer 40 in the search unit 14, the WWW client program is executed and the search request for the image file, etc. are input through the WWW browser 40e.

Figure 8:
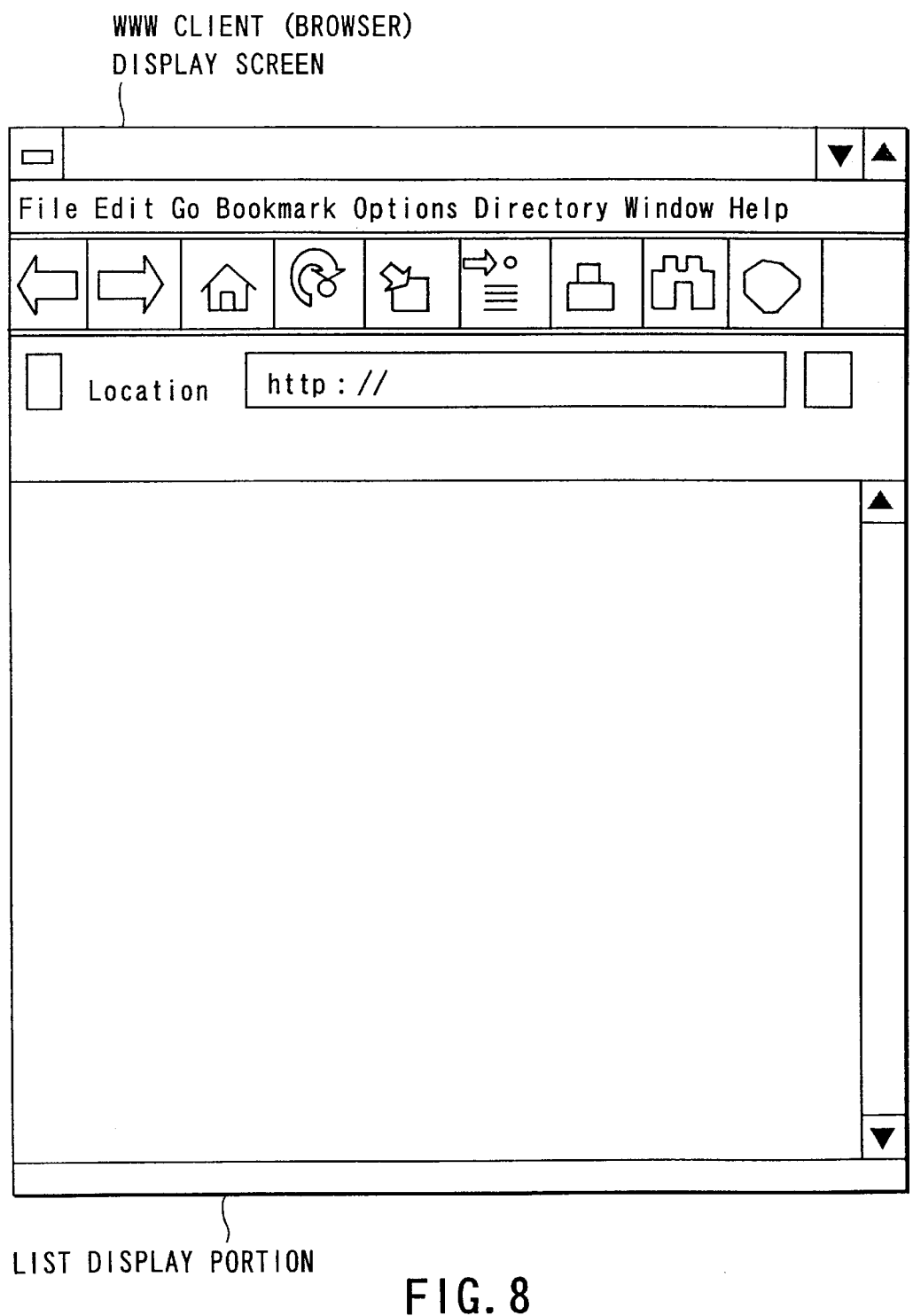
FIG. 8 shows an example of a display screen of a WWW browser shown in FIG. 5.

FIG. 8 shows an example of the display screen of the WWW browser 40e. As is shown in FIG. 8, the display screen of WWW browser 40e is provided with a tool-bar on which icons indicating commands are arranged, an area "Location" for inputting a URL (uniform resource locator) indicating a desired location of information, and an area (list display portion) for displaying information.

At first, the personal computer 40 (WWW client) transmits a URL indicating the CGI program 30b to the WWW server 30a of document server 30 via the WWW browser 40e. The WWW server 30a of document server 30 receives the URL and activates the CGI program 30b.

Thereby, the CGI program 30b provides a file search screen to the WWW browser 40e via the WWW server 30a. In addition, the CGI program 30b acquires a data source existing in the document information accumulation unit 12.

As is shown in FIG. 9, the browser 40e displays a screen for designating the data source for search, user ID, password, and method of listing (bookshelf list or box attribute list). In the input area for the data source to be searched, a list of data sources may be presented upon request, and the name of a selected data source may be set. In the example of FIG. 9, the data source name "ALBA DOC" is set.

For example, in a case where execution of display of the bookshelf list has been designated, if necessary information is set and connection is designated, the document server 30 provides a list of bookshelves belonging to the designated data source. FIG. 10 shows an example of the bookshelf list displayed by the WWW browser 40e. If a desired bookshelf is selected and a button of "document box list" is depressed in the state shown in FIG. 10, the display of the bookshelf list is changed to the display of the document box list as shown in FIG. 12. Subsequently, if a desired document box is selected and a button of "search condition" is depressed in the state shown in FIG. 12, a search condition input screen as shown in FIG. 13 is displayed.

In a case where the execution of the display of the box attribute list has been designated, the document server 30 provides a list of box attributes belonging to the designated data source. FIG. 11 shows an example of the box attribute list displayed by the WWW browser 40e. If a desired box attribute is selected and a button of "search condition" is depressed in the state shown in FIG. 11, the search condition input screen as shown in FIG. 13 is displayed, similarly with the above-described case.

FIG. 13 shows the conditions for search and, for example, character type keywords, numeral type keywords and different name type keywords are designated as the conditions. In addition, the date of formation and the date of updating can be designated as conditions. In the case of the character type keywords, freely chosen words of a natural language are designated.

Figure 14:
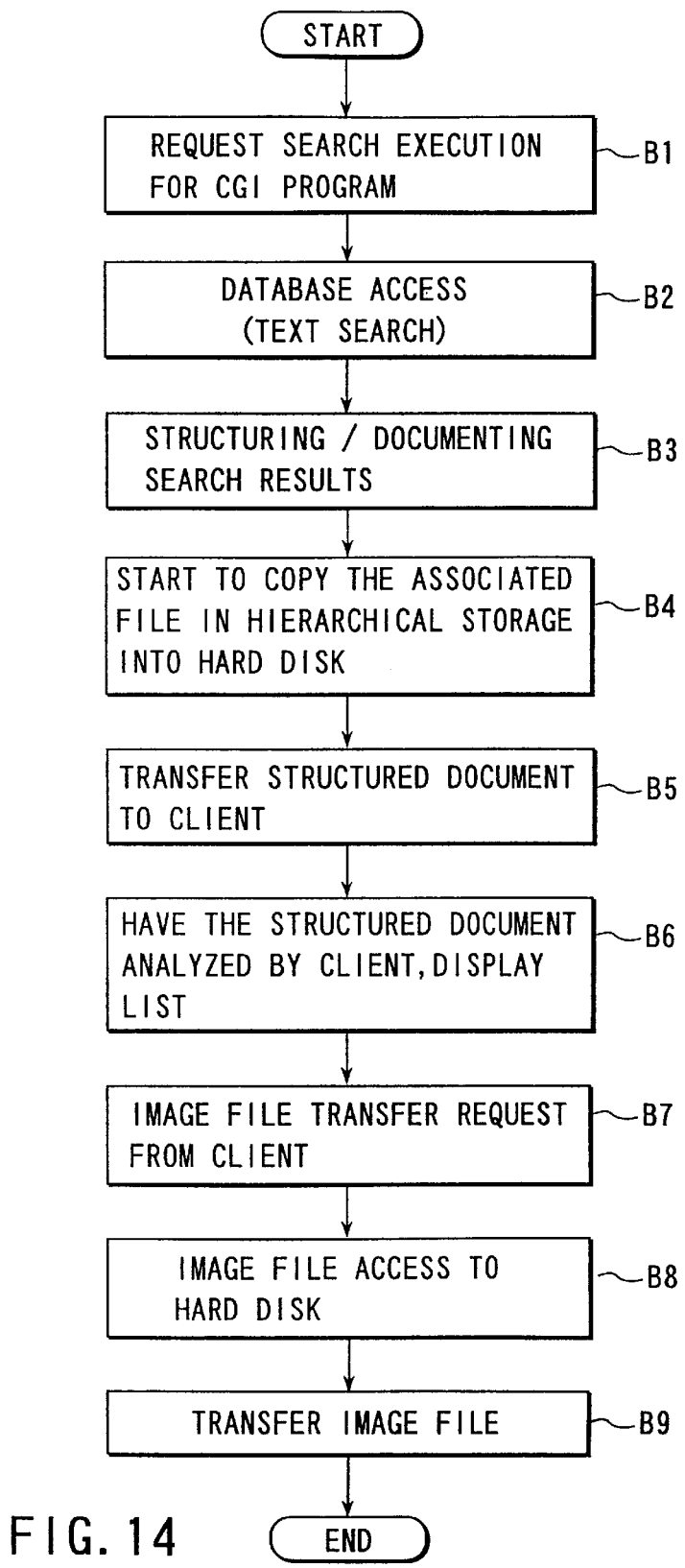
FIG. 14 is a flow chart illustrating an image file search process in this embodiment.

Referring to FIG. 3 and the flow chart of FIG. 14, a description will now be given of an image file search process for searching image files accumulated in the document information accumulation unit 12 on the basis of a search condition designated on the search condition input screen shown in FIG. 13.

If the "search start" button shown in FIG. 13 is selected, the personal computer 40 (WWW client) requests the execution of the image file search to the WWW server 30a on the basis of the search condition set through the WWW browser 40e (step B1).

The WWW server 30a, upon receiving the search execution request, activates the CGI program 30b and executes the search of text files stored in the database 30c and corresponding to the document box to be processed, according to the designated search condition, i.e. the word set as a keyword (step B2). The CGI program 30b executes a full text search for all characters included in each of the text files to be processed and discriminates the text including the word designated by the search condition.

The CGI program 30b acquires, as a search result, the associated text file from the database 30c. The title information of the associated text file is also acquired. The CGI program 30b subjects the search result to a structuring/documentation process, e.g. an HTML (hyper text markup language) process (step B3).

The CGI program 30 starts to acquire an image file accumulated in the hierarchical storage 32, which corresponds to the text file obtained by searching the database 30c, and to copy the image file into the cache area 30e in the hard disk 30d (step B4).

Specifically, the text file obtained by the search of the database 30c is a candidate of the text file corresponding to the finally selected image file and is selected by the personal computer 40 (WWW client). Before the selection is designated, the CGI program 30b starts the process for storing the image file candidate of the search into the cache area 30e of hard disk 30d, from which the file can be read in at a higher speed than from the hierarchical storage 32.

However, if the necessary image file is already present in the hard disk 30d, there is no need to copy the file accumulated in the hierarchical storage 32 into the hard disk 30d.

The details of the process for acquiring the image file from the MO in the autochanger 32b of hierarchical storage 32 will be described later.

The WWW server 30a transfers the search result (HTML document), which was subjected to the HTML process by the CGI program 30b, to the personal computer 40 (WWW client) (step B5).

In the personal computer 40 (WWW client), the WWW browser 40e analyzes the HTML document and displays a list of search results, as selection candidates, which meet the designated search condition (step B6).

FIG. 15 shows an example of a search condition list displayed on the screen of the WWW browser 40e. In the example of FIG. 15, title information itself obtained from the database 30c of document server 30 is not displayed, but information indicating the presence of the text file meeting the search condition is displayed.

On the display screen of the search result list shown in FIG. 15, the search result corresponding to the desired image file is selected and then a "page list" button or a "top page list" button is selected. Thus, the transfer of the image file can be requested.

For example, when the "top page list" button has been selected to request the transfer of the image file, the personal computer 40 (WWW client) transmits to the WWW server 30a the designated search result and the request for transferring the image files for "top page list" (step B7).

The WWW server 30a, in response to the image file transfer request, file-accesses the hard disk 30d (or cache area 30e) and acquires the image file corresponding to the designated search result (step B8).

The WWW server 30a transfers the image file acquired from the hard disk 30d to the personal computer 40 (WWW client) (step B9).

Figure 16:
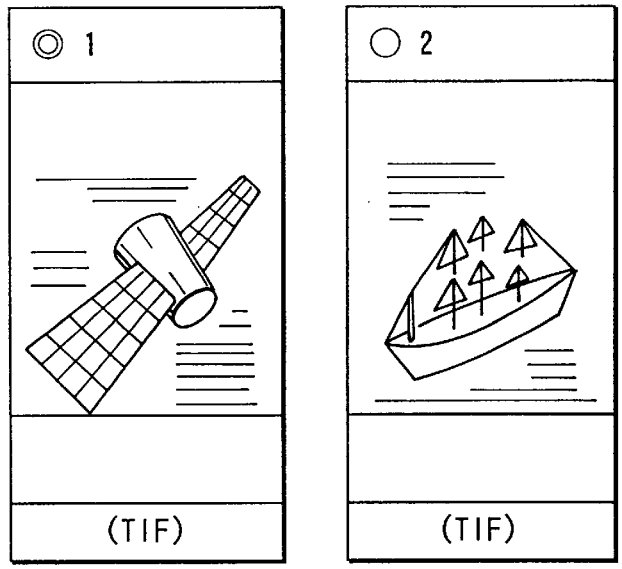
FIG. 16 shows another example of the display screen of the search result displayed on the WWW browser shown in FIG. 5.

In this case, for example, as shown in FIG. 16, the WWW browser 40e displays a top page list of documents (the number of documents being two in FIG. 16) included in the document box to be processed.

Figure 17:
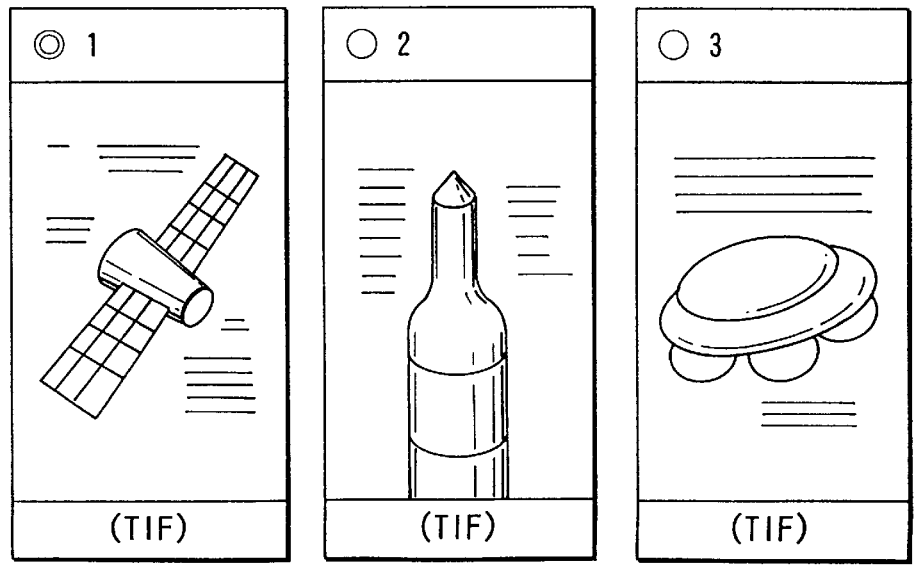
FIG. 17 shows a display example of an objected image file.

Subsequently, on the screen shown in FIG. 16, the top page of any of the documents is selected and the execution of display of "page list" is instructed. Then, as shown in FIG. 17, the personal computer 40 (WWW client) displays through the WWW browser 40e the list of all pages (three pages in FIG. 17) included in the associated document.

Thus, on the basis of the word designated as search condition, a search is conducted for all characters of text files registered in the database 30c as incidental information at the time of registration of image files. The text file candidates (search results) meeting the search condition are found, and the image file accumulated in the document information accumulation unit 12, which corresponds to the selected search result, can be obtained.

In the above description, the CGI program 30b searches the text files registered in the database 30c, using only the designated word (keyword) as search condition. However, the search may be conducted by using the synonym table 30g.

Figures 18, 19:
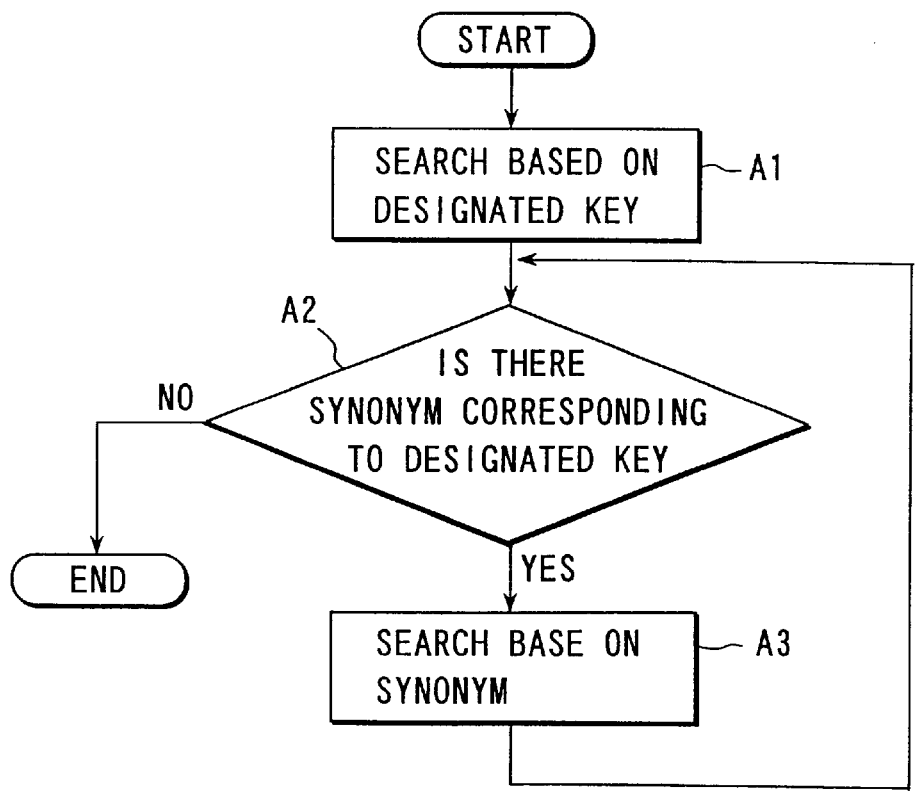
FIG. 18 shows an example of information registered on a synonym table.
FIG. 19 is a flow chart illustrating a procedure for synonym search.

FIG. 18 shows an example of the information registered in the synonym table 30g. As shown in FIG. 18, the word designated as the word of search condition and the corresponding synonyms are registered on the synonym table 30g.

The CGI program 30b searches the text files registered in the database 30c according to the procedure illustrated in the flow chart of FIG. 19.

Specifically, the CGI program 30b conducts the search based on the designated key (word), similarly with the above case (step A1), thus determining whether the designated word is registered in the keys of the synonym table 30g (step A2).

If the designated word is registered in the synonym table 30g as the key shown in FIG. 18, the text files registered in the database 30c are searched by using the synonyms corresponding to the designated word, like the process based on the designated word (step A3).

If the associated text files have been searched on the basis of the synonyms corresponding to the word designated by the CGI program 30b, the WWW server 30a transmits these files to the personal computer 40 (WWW client) as search results.

Accordingly, even if the word designated as search condition is too ambiguous to search the image file, the search based on its synonyms can be performed to acquire associated information search candidates.

The process for acquiring the image file from the MO of autochanger 32b of hierarchical storage 32 in step B4 in the flow chart of FIG. 14 will now be described in detail with reference to FIGS. 20A, 20B, 20C and 20D.

In general, at the time of file access, the drive for activating the recording medium storing desired files is designated along with the file path (directory). In the process of acquiring the image file by the CGI program 30b of the present embodiment, the medium storing the desired file and the image file are designated, as shown in FIG. 20A.

On the basis of the title information (see FIG. 7) obtained by searching the text files registered in the database 30c, the CGI program 30b designates the medium storing the desired file and the path to the image file, as shown in FIG. 20A.

If the file access is designated for the media MO stored in the autochanger 32b, the hierarchical storage 32 discriminates the media MO of the associated slot, on the basis of a conversion table shown in FIG. 20B, and mounts this media MO in the available drive in the MO drive 32a.

In the example shown in FIG. 20C, a drive 2 with drive name F of four drives 1 to 4 with drive names E, F, G and H is available. Thus, the media MO (the upper surface thereof being used) of designated slot 1 is mounted in this drive.

The controller 32c enables the document server 30 to make file access to the media MO mounted in accordance with the use condition of drives 1 to 4 of MO drive 32a. Specifically, as shown in FIG. 20D, the designation of media based on the title information is changed to drive name (e.g. "F:"). Thus, the image file can be acquired from the media MO in slot 1 of autochanger 32b by the designation of the general drive name and image file path.

Since the file access to the media MO of autochanger 32b can be performed, as illustrated in FIGS. 20A to 20D, there is no need to assign the drive names (e.g. A to Z), the number of which is limited, to the media MOs. Thus, the number of media MOs provided in the autochanger 32b is not limited, and the hierarchical storage 32 having a large memory capacity can be obtained.

Another embodiment of the present invention will now be described. Since the structure of this embodiment is substantially the same as that of the preceding embodiment (FIGS. 1 to 6), only different portions will be described.

Information recorded on the paper media such as documents and slits, which is read in by the OCR 24, color scanner 22 and digital PPC 26, is generally called "document" hereinafter. Suppose that the document consists of one or more pages. For example, one document consists of plural pages, while another one page. Accordingly, the number of text files and image files, which correspond to one document transferred from the image file input control apparatus 20 to the filing unit 30f, corresponds to the number of pages of the document.

The filing unit 30f stores in the database 30c the text files to be filed which have been transferred from the image file input control apparatus 20, and also stores the image file in the hard disk 30d or in the MO of hierarchical storage 32.

In addition, the filing unit 30f prepares data indicating the correspondency between each word of all text files stored in the database 30c and image files stored in the hard disk 30d or the MO in hierarchical storage 32, which correspond to the text including the word. The filing unit 30f stores the prepared data indicating the correspondency in the database 30c in the form of three tables (document table, text table and image table) to be described below.

The three tables are shown in FIGS. 21, 22 and 23. The text table and document table are jointed by joint numbers, and the document table and image table are jointed by joint numbers. Instead of jointing the tables by the numbers, the three tables may be integrated into one table.

FIG. 21 shows a data structure of the document table 100. In the document table 100, a document number (ID number) 101 assigned to each image file of the document read in from the OCR 24, color scanner 22 or digital PPC 26 is associated with search keys 102 and joint number 103.

The search keys 102 comprise two: the title of the document and the name of the producer of the document. These items are input in advance by key input, etc. at the time of registering images in the system. The joint number 103 is assigned to each document number 101 in order to joint the document table 100 and image table 108.

FIG. 22 shows a data structure of the text table 104. In the text table 104, a word 101 extracted from the text is associated with a document number 106 of a document including that word and a page number 107 of a page on which the word appears in the document.

The word 105 is, for example, a noun which is extracted from all text files stored in the database 30c by the filing unit 30f and can be used as a key for full-text search. The document number 106 is a number of a document from which the word 105 is extracted, and the page number 107 is a number of a page of the document, on which the word is described. If the text table 104 is referred to, the document number of the document including the word and the corresponding page number in the document can be found from the word 105.

One document number and one page number are not always stored in association with one word. There may be plural documents and pages including the word 105. In this case, plural document numbers 106 and plural page numbers 107 are stored in association with one word 105.

FIG. 23 shows a data structure of the image table 108. One unit of image table 108 is prepared for each document. The image table 108 is associated with the document number of document table 100 shown in FIG. 21 by means of the joint number. Since the document is filed in units of a page, the page number is associated with a media number 110 for identifying the storage medium and a file name 111.

In other words, in each image table, the media number in hierarchical storage 32 storing the image file of the document corresponding to the document number indicated by the corresponding joint number is associated with the file name.

Such information is obtained, from the image table 108 shown in FIG. 23 corresponding to joint number 1, that the document with document number 1 comprises four pages and each page file is stored in the storage medium of media number MO1 in hierarchical storage 32 with the corresponding file name.

The operation of searching the image file accumulated in the document information accumulation unit 12 according to this embodiment will now be described with reference to flow charts. In this operation, an image file of a document having a text including a predetermined word is searched and displayed.

Figure 24:
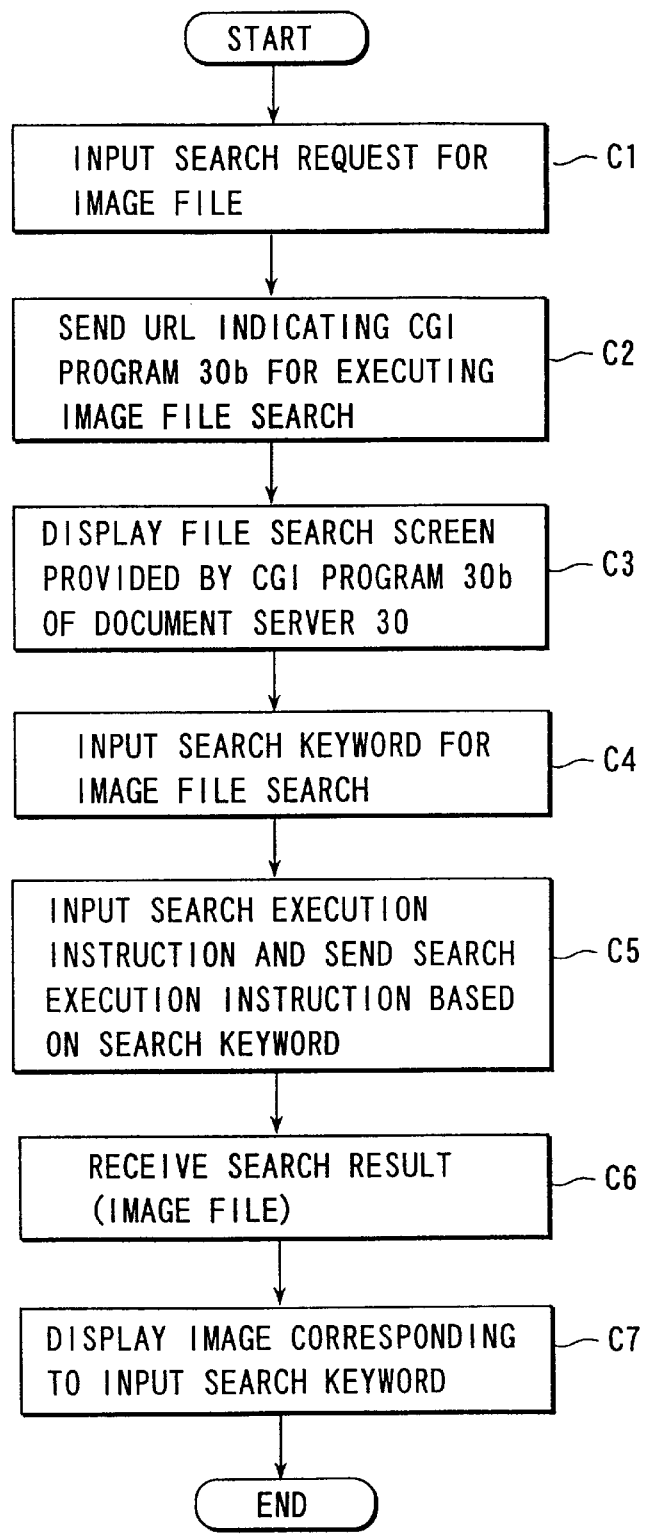
FIG. 24 is a flow chart illustrating processing of a search request from a personal computer (WWW client).
Figure 25:
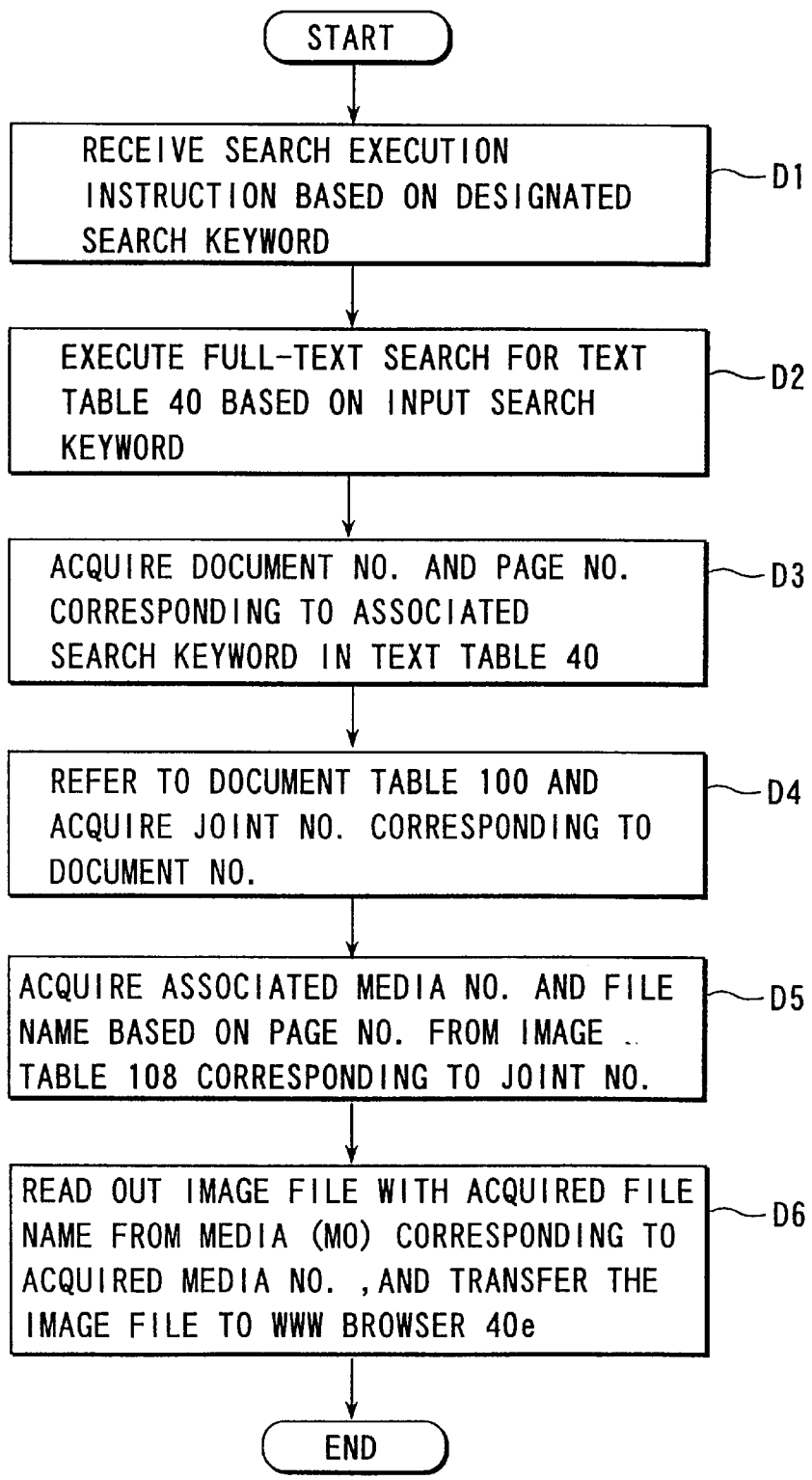
FIG. 25 is a flow chart illustrating an operation in the document information accumulation unit (document server).

FIG. 24 is a flow chart illustrating the operation in the personal computer 40 (WWW client) and FIG. 25 is a flow chart illustrating the operation in the document information accumulation unit 12 (document server 30).

In the personal computer 40 of search unit 14, the WWW client program is executed and an image file search request is input through the WWW browser 40e (step C1).

The URL indicating the CGI program 30b is transmitted to the WWW server 30a of document server 30 from the personal computer 40 (WWW client) through the WWW browser 40e (step C2).

Thus, the CGI program 30b provides the file search screen to the WWW browser 40e through the WWW server 30a. The WWW browser 40e displays the screen (graphical user interface (GUI)) for inputting the necessary search conditions provided by the CGI program 30b (step C3). In this screen display step, the input of the search keyword for searching the image file is required. Suppose that the operator of the personal computer 40 (WWW client) has input a search keyword "computer" (step C4).

If the word for image file search has been designated and the search execution instruction has been input, the personal computer 40 transmits a search execution instruction based on the designated search keyword to the document server 30 (WWW server 30a) (step C5).

If the search execution instruction from the personal computer 40 on the basis of the designated search keyword has been received (step D1), the document information accumulation unit 12 executes the following search operation. Specifically, the personal computer 40 (WWW client) sends through the WWW browser 40e an image file search execution request based on the designated search condition to the WWW server 30a.

The WWW server 30a activates the CGI program 30b and executes the full-text search based on the designated search condition, i.e. the search keyword "computer" with respect to the word 105 in the text table 104 shown in FIG. 22 (step D2).

The CGI program 30b refers to the text table 104 stored in the database 30c and determines whether the word "computer" is registered. As a result, the CGI program 30b searches the word "computer" from the word 105 of text table 104 and acquires, for example, document number "1" and page number "4" corresponding to the word "computer" (step D3).

Then, the CGI program 30b refers to the document table 100 stored in the database 30c and acquires the joint number of the document corresponding to the document number "1" acquired from the text table 104 (step D4). In the example of FIG. 21, the joint number corresponding to the document number "1" is "1".

Subsequently, the CGI program 30b acquires the media number 110 and file name 111 corresponding to the page number "1" acquired from the text table 104, with reference to the image table 108 stored in the database 30c which corresponds to the joint number "1" acquired from the document table 100 (step D5). Specifically, the CGI program 30b acquires the media number "MO1" indicating the medium in the hierarchical storage 32 storing the image file on the fourth page of the document with document number "1", and the file name "ooo.tif".

On the basis of the media number and file name acquired from the image table 108, the CGI program 30b searches the hierarchical storage and reads out the associated image file. Specifically, the CGI program 30b reads out the image file with file name "ooo.tif" from the MO with media number "MO1" in the hierarchical storage 32, and transfers the image file to the WWW server 30a. The WWW server 30a then transfers the image file to the WWW browser 40e of personal computer 40 (WWW client) (step D6).

Upon receiving the search result (image file) from the WWW server 30a (step C6), the personal computer 40 (WWW client) instructs the activated WWW browser 40e to display the image file of the fourth page of the document with document number "1" which has the text image file including the word "computer".

In the above description, only the image file corresponding to the page number acquired from the text table 104 is searched. Thus, only the image file of the fourth page of the document with document number "1" is transmitted from the hierarchical storage 32 to the personal computer 40. It is possible, however, that the image files of all pages of the document with document number "1" acquired from the text table 104 are read out and transferred to the WWW browser 40e of personal computer 40 (WWW client) along with the page number "4" of the associated page.

In this case, on the basis of the received page number "1", the WWW browser 40e first displays the image file of the fourth page and then selectively displays the image file of another page in accordance with the instruction from the operator.

In a case where a document corresponding to one document number is not treated but a plurality of document numbers and a plurality of page numbers are acquired from the text table 104 on the basis of the search keyword, each page number and the title and name of the producer of the document, which are search keys corresponding to each document number read out from the document table 100, may be transferred to the personal computer 40 and image files of all pages of the document corresponding to each document number may be read out and transferred to the personal computer 40.

The WWW browser 40e displays, as search results, the data transferred from the hierarchical storage 32.

FIG. 26 shows a display screen of search results. As a result of search, a list of the titles of a plurality of acquired documents, the names of producers and the associated page numbers is displayed. Below the list, six command buttons are displayed: "page list", "top page list", "select", "next page", "previous page" and "page select".

If the document number of a desired document is clicked and then the "select" command button is clicked, a top page of the desired document is displayed on the entire screen. On this screen, too, the three command buttons, "next page", "previous page" and "page select", are displayed. By freely operating these buttons, the operator can freely turn the pages or find a desired page by short-cut.

If the document number of a desired document is clicked and then the "page list" command button is clicked, all pages of the desired document are displayed at a time as reduced images on one screen, as shown in FIG. 17. If the number of pages is too large to display all pages on one screen at a time, a scroll operation or a screen switch operation is performed.

If the "top page list" command button is clicked, a screen as shown in FIG. 16 is displayed. That is, top pages of all listed documents are displayed as reduced images on one screen.

On the other hand in the case of the search result screen of FIG. 27, the top pages of all listed documents are displayed as reduced images on one screen at a time. Under each reduced image, the document name and the page number of the page including the search key are arranged. Unlike the screen of FIG. 16, the screen of FIG. 27 shows four command buttons: "next page", "previous page", "page select" and "select." The functions of these command buttons are as described above.

The search result screen may display the pages including the search keys in all listed documents as a reduced image, as shown in FIG. 27.

As described above, image files of all pages in the document corresponding to the document number can be read out at a time. In addition, if the page number of the associated page is added, the image file of this page can be preferentially displayed. Moreover, if an image file of another page is needed (it is highly possible to refer to a preceding or following image file in the document), there is no need to newly receive an image file from the document server 30 and thus the image file can be displayed quickly.

Not only the image file read out from the hierarchical storage 32, but also the search keys 102 (name of document, name of document producer) acquired from the document table 100, the page number acquired from the text table 104 and the file name acquired from the image table 108 may be transferred to the WWW browser 40e at the same time. Thereby, the WWW browser 40e can display not only the image but also the aforementioned various information acquired from each table. Thus, the display mode of the search results becomes more effective.

For example, a list of titles may be displayed in a mode similar to the display mode of search results shown in FIG. 15, and thus the image file of a designated page in the document selected from the list of titles can be displayed.

The search condition is not limited to the search keyword. The image file search can also be executed by designating a synonym of the keyword. In this case, synonyms corresponding to a given word are registered as words 105 on the text table 104. The synonyms of the word input as search condition are discriminated by using the synonym table shown in FIG. 18. Each synonym is treated like the input word, and the image file is searched.

In the above description, the search execution is instructed only by designating the word. However, since the search keys 102 (name of document, name of document producer) corresponding to the document number 101 are registered on the document table 100, the image file search based on the search key can be executed as a matter of course. Specifically, when the search key is designated as search object, the document table 100 is searched and the corresponding joint number is acquired. Based on the joint number, the image file is acquired similarly with the above case. In addition, since the search object is restricted by executing the designation of the word and the designation of the search key in combination, the desired image file can be acquired efficiently.

In this manner, the search is executed by providing the document table 100, text table 104 and image table 108, and a given word is designated. Thus, the image file of the associated page of the document including this word can be directly search and displayed. Therefore, a necessary file can be efficiently acquired from a great deal of image files stored in the hierarchical storage 32.

In the structure shown in FIG. 1, the search unit 14 communicates with the WWW server 30a of document server 30 by means of the personal computer 40 through the WWW browser 40e. It is possible, however, to use an exclusive-use terminal, too, for accessing the information accumulated in the document information accumulation unit 12.

When the exclusive-use terminal is used, the document server 30 is provided with functions for the exclusive-use terminal for communication with the exclusive-use terminal and an access control to the database 30c and hierarchical storage 32 without using the CGI program 30b.

The method described in the above embodiments may be applied to various apparatuses by writing programs to be executed by the computer in recording media such as magnetic disks (floppy disk, hard disk, etc.), optical disks (CD-ROM, DVD, etc.) or semiconductor memories, or by transmitting the programs through communication media. The computer constituting the present apparatus executes the above processing by reading in the program recorded on a recording medium and controlling the operations according to this program.

We claim:

1. A document management system comprising:
   image read means for reading image information of a document and outputting the image information;
   storage means for storing the image information output from said image read means;
   means for character-recognizing character information included in the image information output from said image read means, and converting the character information to text data;
   means for preparing a table for managing said document, on which a plurality of words included in the text data, an identification code for the document, and a page number of a page in the document on which the words are present, are associated;
   means for inputting a search keyword;
   search means for specifying the document in which the search keyword is present and the page number, with reference to the table on the basis of the search keyword; and
   display means for displaying, in an associated manner, an image of a top page of the document specified by said search means and the page number.

2. A document management method comprising the steps of:
   reading image information of a document with use of image read means;
   storing the image information read by the image read means in storage means;
   character-recognizing character information included in the image information read by the image read means, and converting the character information to text data;
   preparing a table for managing said document, on which table a plurality of words included in the text data, an identification code for the document, and a page number of a page in said document on which said words are present, are associated;
   inputting a search keyword;
   specifying the document in which said search keyword is present and the page number, with reference to the table on the basis of the search keyword; and
   displaying, in an associated manner, an image of a top page of the document specified by the search means and the page number.

3. A memory storing a computer-executable program code, the program code comprising:
   means for causing a computer to read information of a document with use of image read means;
   means for causing a computer to store the image information read by the image read means in storage means;
   means for causing a computer to character-recognize character information included in the image information read by the image read means, and converting the character information to text data;
   means for causing a computer to prepare a table for managing said document, on which table a plurality of words included in the text data, an identification code for the document, and a page number of a page in said document on which said words are present, are associated;
   means for causing a computer to input a search keyword;
   means for causing a computer to specify the document in which said search keyword is present and the page number, with reference to the table on the basis of the search keyword; and
   means for causing a computer to display, in an associated manner, an image of the top page of the specified document and the page number.

4. A document management system comprising:
   image read means for reading image information of a document and outputting the image information;
   storage means for storing the image information output from the image read means;
   means for character-recognizing character information included in the image information output from the image read means, and converting the character information to text data;
   means for preparing a table for managing said document, on which table a plurality of words included in the text data, an identification code for the document, and a page number of a page in said document on which said words are present, are associated;
   means for inputting a search keyword;
   search means for specifying the document in which said search keyword is present and the page number, with reference to the table on the basis of the search keyword; and
   means for displaying, in a listed manner, an image of a page specified by said page number of the document specified by the search means.

5. A document management method comprising the steps of:
   reading image information of a document with use of image read means;
   storing the image information read by the image read means in storage means;
   character-recognizing character information included in the image information read by the image read means, and converting the character information to the text data;

preparing a table for managing said document, on which table a plurality of words included in the text data, an identification code form the document, and a page number of a page in said document on which said words are present, are associated;

inputting a search keyword;

specifying the document in which said search keyword is present and the page number, with reference to the table on the basis of the search keyword; and displaying, in a listed manner, an image of a page specified by said page number of the specified document.

6. A memory storing a computer-executable program code, the program code comprising:

means for causing a computer to read image information of a document with use of image read means;

means for causing a computer to store the image information read by the image read means in storage means;

means for causing a computer to character-recognize character information included in the image information read by the image read means, and converting the character information to text data;

means for causing a computer to prepare a table for managing said document, on which table a plurality of words included in the text data, an identification code for the document, and a page number of a page in said document on which said words are present, are associated;

means for causing a computer to input a search keyword;

means for causing a computer to specify the document in which said search keyword is present and the page number, with reference to the table on the basis of the search keyword; and means for causing a computer to display, in a listed manner, an image of a page specified by said page number of the specified document.

* * * * *

UNITED STATES PATENT AND TRADEMARK OFFICE
CERTIFICATE OF CORRECTION

PATENT NO.    : 6,055,530
DATED         : April 25, 2000
INVENTOR(S)   : Minoru Sato It is certified that error appears in the above-identified patent and that said Letters Patent is hereby corrected as shown below:

<u>Claim 5, column 17,</u>
Line 3, "from" should read --for--.

Signed and Sealed this

Seventeenth Day of July, 2001

Attest:

Attesting Officer

NICHOLAS P. GODICI
*Acting Director of the United States Patent and Trademark Office*